United States Patent
Suzuki et al.

(10) Patent No.: US 6,884,538 B2
(45) Date of Patent: Apr. 26, 2005

(54) FUEL CELL SEPARATOR AND METHOD FOR MANUFACTURING THE SAME

(75) Inventors: Sinzaburou Suzuki, Hamamatsu (JP); Toru Segawa, Hamamatsu (JP); Tsuyoshi Inagaki, Hamamatsu (JP); Kouji Nagai, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 17 days.

(21) Appl. No.: 10/106,452

(22) Filed: Mar. 27, 2002

(65) Prior Publication Data

US 2002/0177028 A1 Nov. 28, 2002

(30) Foreign Application Priority Data

Mar. 27, 2001 (JP) .................................... P2001-090367
Mar. 28, 2001 (JP) .................................... P2001-093302

(51) Int. Cl.[7] ............................ H01M 2/16; B05D 5/12
(52) U.S. Cl. ........................... 429/38; 429/34; 427/115
(58) Field of Search ............................ 429/34, 38, 39; 427/115

(56) References Cited

U.S. PATENT DOCUMENTS

| | | | | |
|---|---|---|---|---|
| 4,217,401 A | * | 8/1980 | Pellegri et al. | 429/39 |
| 4,301,222 A | * | 11/1981 | Emanuelson et al. | 429/251 |
| 4,339,322 A | * | 7/1982 | Balko et al. | 204/255 |
| 6,180,275 B1 | * | 1/2001 | Braun et al. | 429/34 |
| 6,348,279 B1 | * | 2/2002 | Saito et al. | 429/34 |
| 6,395,416 B1 | * | 5/2002 | Tanemoto et al. | 429/34 |
| 6,468,685 B1 | * | 10/2002 | Yoshida | 429/34 |
| 6,686,083 B1 | * | 2/2004 | Saito et al. | 429/34 |
| 2002/0055030 A1 | * | 5/2002 | Okumura et al. | 429/34 |

FOREIGN PATENT DOCUMENTS

| | | | |
|---|---|---|---|
| EP | 1 020 941 A2 | 7/2000 | |
| EP | 1 061 597 A2 | 12/2000 | |
| JP | 62272465 A | * 11/1987 | ............ H01M/8/02 |
| JP | 63-294610 | 12/1988 | |
| JP | 4-214072 | 8/1992 | |
| JP | 11-354136 | 12/1994 | |
| JP | 2000-82476 | 3/2000 | |
| JP | 2000082476 A | * 3/2000 | ............ H01M/8/02 |
| JP | 2000-133281 | 5/2000 | |
| WO | WO 00/57506 | 9/2000 | |

* cited by examiner

Primary Examiner—Patrick Ryan
Assistant Examiner—Tracy Dove
(74) Attorney, Agent, or Firm—Nixon & Vanderhye P.C.

(57) ABSTRACT

A fuel cell separator containing conductive material and epoxy resin is provided. In the fuel cell, the epoxy resin is made of solid epoxy resin whose epoxy equivalent weight is 300–500. Further, according to another fuel cell separator, raw materials containing not lower than 60 weight % of conductive material and 34–40 weight % of resin material are kneaded, and adjusted to have a flow index of 5–20%. A kneaded compound is compression-molded so that a fuel cell separator is obtained.

8 Claims, 1 Drawing Sheet

FUEL CELL SEPARATOR AND METHOD FOR MANUFACTURING THE SAME

BACKGROUND OF THE INVENTION

1. Field of the Invention

The present invention relates to a fuel cell separator containing a mixture of conductive material and resin as its main components and a method for manufacturing the fuel cell separator, and particularly relates to a technique for reducing the thickness of the fuel cell separator.

Further, the present invention relates to a fuel cell separator containing conductive material and epoxy resin, and particularly relates to a fuel cell separator made to have high strength.

2. Description of the Related Art

For example, as shown in the schematic perspective view in FIG. 1, a fuel cell separator 10 is formed by erectly providing a plurality of partitions 12 at predetermined intervals on the opposite sides of a flat plate portion 11. To form a fuel cell, a large number of such fuel cell separators 10 are laminated in the direction in which the partitions 12 project (in the up/down direction in the drawing). Then, by this lamination, reactive gas (hydrogen or oxygen) is designed to be circulated in each channel 13 formed by a pair of adjacent partitions 12.

It is required to make a fuel cell compact as a whole for wide use of the fuel cell. To this end, reduction in the thickness of the flat plate portion 11 or the partitions 12 of the fuel cell separator 10 is required. However, the fuel cell separator 10 is generally manufactured by compression molding of a kneaded compound having graphite material and resin as its main components into an illustrated shape. Thus, along with reduction in thickness, compression failure is easily produced at the time of the compression molding. In the present situation, there is therefore a limit to the thickness to be reduced.

Further, since the reactive gas is generally circulated in these channels 13 at a pressure of 0.1–0.3 MPa, strength high enough to prevent the fuel cell separators 10 from being deformed by this gas pressure is required of the fuel cell separators 10. To this end, strength is conventionally secured by blending polyimide resin or the like. Alternatively, fibrous material is blended to enhance the strength. For example, JP-A-63-294610 and JP-A-2000-133281 disclose fuel cell separators in which carbon fibers are blended, and JP-A-4-214072 and JP-A-2000-82476 disclose fuel cell separators in which various fibrous materials are blended.

Nowadays, it is said that electric vehicles mounted with fuel cells will be put into practical use in the near future. To bring the electric vehicles into wide use, it is essential to reduce the price of fuel cells. Several hundreds of fuel cell separators are required in each fuel cell vehicle. Reduction in the cost of such fuel cell separators is important for reduction in the price of a fuel cell. In the above-mentioned method in which polyimide resin is blended, however, the polyimide resin expensive in price becomes an obstacle to reduction in cost.

On the other hand, in each of the methods in which fibrous material is blended, there is a problem that when the fibrous material is blended, the fluidity of a raw material kneaded compound becomes so low that the formability deteriorates. Generally, each fuel cell separator is required to be formed into a finer and complicated irregular shape for the purpose of making reactive gas flow uniformly and at an appropriate flow rate, further facilitating the discharge of the generated moisture, and so on. However, when the fluidity of the raw material kneaded compound is poor, the raw material kneaded compound cannot reach every corner of a mold uniformly at the time of molding, so that the fuel cell separator obtained becomes uneven in the quality of the material. As a result, there arises such a problem that the reproducibility of the fine irregular shape deteriorates. Reduction not only in cost but also in size is demanded in a fuel cell. To this end, respective portions of fuel cell separators have to be thinned. However, when the formability of the raw material kneaded compound is poor, such reduction in the thickness cannot be achieved. Thus, each of the above-mentioned methods in which fibrous material is blended is undesirable to obtain a high-performance and thin fuel cell separator.

SUMMARY OF THE INVENTION

Accordingly, an object of the present invention is to provide a fuel cell separator which can sufficiently cope with the requirement of reduction in thickness as well as basic performance such as sealing properties or the like, and a method for manufacturing the aforementioned fuel cell separator.

Further, the present invention was developed in consideration of such circumferences. Accordingly, another object of the present invention is to provide a high-performance fuel cell separator whose strength is made so high that reduction in price and thickness can be achieved.

In order to solve the foregoing object, the present inventors made diligent researches into fuel cell separators having conductive material and resin as their main components. As a result, the present inventors found that, when the compounding ratio between conductive material and resin was specified, compression failure became difficult to be produced even if the thickness was reduced. This finding brought about completion of the present invention.

That is, in order to solve the foregoing object, the present invention provides a fuel cell separator characterized by containing not lower than 60 weight % of conductive material and 34–40 weight % of resin material.

Further, the present invention provides a method for manufacturing a fuel cell separator, characterized by comprising the step of kneading raw materials containing not lower than 60 weight % of conductive material and 34–40 weight % of resin material, and the step of compression-molding an obtained kneaded compound so as to form a fuel cell separator, while the aforementioned kneaded compound adjusted to have a flow index of 5–20% is compression-molded. Incidentally, the aforementioned flow index is a value obtained in a method for testing flow of thermoplastic resin based on JIS K7210. Specifically, as shown in FIG. 2, a tester in which a hole 2 having an inner diameter of 1 mm is provided continuously to the lower portion of a hole 1 having an inner diameter of 10 mm is heated to 180° C. Then, a preformed product S made of the aforementioned kneaded compound and having an initial weight with an outer diameter of 8 mm is thrown into the hole 1 having the inner diameter of 10 mm. The preformed product S is then pressed in at a constant load (10 MPa) by a pressure member 3, and retained for 4 minutes. After that, a specimen 4 flowing out from the hole 2 is cut out. The weight of the specimen 4 is measured, and the flow index is obtained in accordance with the following expression.

flow index=[(weight of preformed product S–weight of specimen 4)/weight of specimen 4]×100(%)

Further, to attain the foregoing object, the present invention provides a fuel cell separator containing conductive material and epoxy resin, characterized in that the above-mentioned epoxy resin is made of solid epoxy resin whose epoxy equivalent weight (EEW) is 300–500, and preferably an amount of the epoxy resin is 20–40 weight %.

DETAILED DESCRIPTION OF THE PREFERRED EMBODIMENTS

First Embodiment

Figure 1:
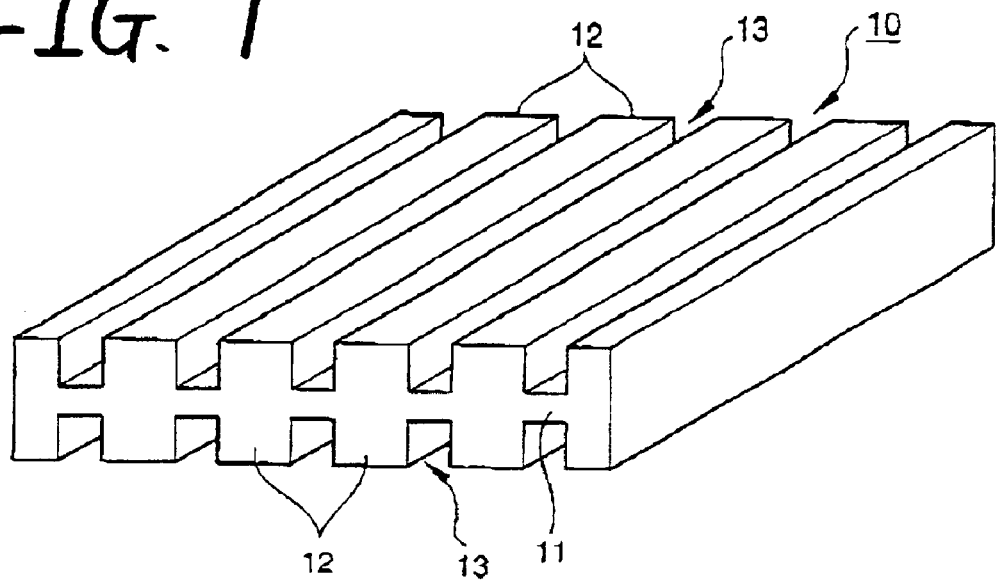
FIG. 1 is a schematic perspective view showing an example of a fuel cell separator according to the present invention and in the related art.

Description of a first embodiment will be made below in detail about the present invention.

In a fuel cell separator according to the present invention, the amount of conductive material is set to be not lower than 60 weight %. This is intended to secure low resistivity (high conductivity) of the fuel cell separator when it is made thin. It is preferable that graphite particles and carbon fibers are used together as this conductive material. This is intended to secure conductivity by the graphite particles and to secure conductivity and strength by the carbon fibers. Further, it is preferable that the compounding ratio between the two is set so that the ratio of the graphite particles to the carbon fibers is 5–10 to 1 on a weight basis.

As the graphite particles, artificial graphite, flake graphite and soil graphite as well as expanded graphite may be used. Alternatively, carbon particles such as carbon black or the like may be used instead of the graphite particles. As the carbon fibers, whiskers coated with carbon may be used as well as carbon fibers. Alternatively, inorganic fibers such as metal fibers or whiskers coated with metal may be used instead of the carbon fibers. Further, although the dimensions and shapes of the graphite particles and the carbon fibers are not limited, it is preferable that the graphite particles are approximately 10–100 $\mu$m in average particle size, and the carbon fibers are approximately 5–30 $\mu$m in fiber diameter and approximately 100–500 $\mu$m in fiber length.

In addition, the amount of the resin material is set to be 34–40 weight %. This is intended to satisfy items such as formability, shape retention properties at the time of reduction in thickness, good releasability from a compression molding mold used at the time of manufacturing, sealing properties and low resistivity of an obtained fuel cell separator. That is, when the amount of the resin material is lower than 34 weight %, the fluidity of the raw material kneaded compound deteriorates so that compression failure is apt to be produced at the time of compression molding. Thus, it becomes difficult to reduce the thickness. On the contrary, when the amount of the resin material exceeds 40 weight %, the amount of the conductive material is reduced so that the conductivity of an obtained fuel cell separator becomes low. In addition, the properly of the resin material emerges so strongly that the releasability from the compression molding mold deteriorates. Further, due to the deterioration of the releasability, flatness in the surface of the fuel cell separator is impaired so that the sealing properties deteriorate. Incidentally, when the greater reduction in thickness is asked for, it is preferable that the amount of the resin material is set to be in a range of 35–38 weight %.

Incidentally, there is no limit on the kind of resin material. Various kinds of resins conventionally used as fuel cell separators may be used suitably. For example, it is possible to use one kind or a mixture of a plurality of kinds selected from thermosetting resins such as phenolic resin, epoxy resin, melamine resin, unsaturated polyester resin, diallyl phthalate resin or polyimide resin, and thermoplastic resins such as polypropylene resin, polycarbonate resin, ABS resin, polyethylene terephthalate resin or polybutylene terephthalate resin.

In addition, in the fuel cell separator according to the present invention, materials other than the conductive material and the resin material may be mixed in accordance with necessity. For example, inorganic particles or inorganic fibers other than graphite, organic fibers, etc. may be added as reinforcing material.

Further, the mixed material including an epoxy resin whose epoxy equivalent weight is 300–500 shows high strength even if carbon fiber is not included. Moreover, since no fiber is included, a flow index is improved and reduction in thickness can be accomplished even if the amount of the resin material is set to be 20 weight %, which is less than 34 weight %.

To manufacture the fuel cell separator according to the present invention, first, the above-mentioned conductive material, the above-mentioned resin material, and, if necessary, the above-mentioned reinforcing material are kneaded in a predetermined compounding ratio. Thus, a kneaded compound is obtained. At this time, in consideration of molding with the thickness reduced, it is preferable that the flow index of the kneaded compound is adjusted to be 5–20%. Next, the kneaded compound is compression-molded by use of a molding tool having a predetermined shape. Thus, a fuel cell separator is obtained. The molding conditions may be similar to those in the prior art. In addition, there is no limit on the shape of the fuel cell separator. For example, the shape can be formed to have the structure shown in FIG. 1.

Alternatively, a molding tool whose inner wall has been applied with graphite powder may be used for the aforementioned compression molding. Thus, a fuel cell separator in which a graphite layer has been formed in the surface can be obtained. In such a fuel cell separator having a graphite layer, the contact resistance becomes lower. Further, when the molding tool with graphite powder adhering thereto is used, the releasability from the molding tool is enhanced. Thus, there is also an advantage that a fuel cell separator high in accuracy of the shape and excellent in sealing properties can be obtained.

As the graphite powder to adhere, graphite powder the same as that which is mixed in the above-mentioned kneaded compound may be used, or another graphite powder may be used. In addition, although there is no limit on the layer thickness of this graphite layer, it is adequate to form the graphite layer to be approximately 20–50 $\mu$m thick. For this reason, the amount of the graphite powder for forming this graphite layer is not included in the aforementioned compounding ratio between the graphite material and the resin material.

Incidentally, in the case where the molding tool with graphite powder adhering thereto is used, when the amount of the resin material in the kneaded compound exceeds 40 weight %, the graphite layer in the surface is broken easily by the expansion of the resin material. Also from this fact, it is necessary to set the upper limit of the amount of the resin material at 40 weight %.

EXAMPLES ACCORDING TO FIRST EMBODIMENT

The first embodiment of the present invention will be described below more specifically with its examples and comparative examples. However, the present invention is not limited to these examples at all.

Examples 1 to 5, and Comparative Examples 1 and 2

Using the following conductive material and resin material, kneaded compounds were prepared in the compounding ratios shown in Table 1 respectively. Then, fuel cell separators were manufactured out of the kneaded compounds in the following method. Incidentally, the shape shown in FIG. 1 was adopted as the shape of each of the fuel cell separators.

[Conductive Material]
  expanded graphite particle (average particle size 100 μm)
    carbon fiber (fiber diameter 13 μm and fiber length 370 μm)

[Resin Material]
  epoxy resin:polyimide resin=5:1

[Manufacturing Method]
Each of the kneaded compounds of the conductive material and the resin material was poured into a molding tool whose inner wall had been applied with graphite powder having a particle size of 100 μm. Then, compression molding was performed at a temperature of 170° C. and at a pressure of 98 MPa.

In addition, the flow index of the kneaded compound, the adhesion properties at the time of molding, the limit thickness, the intrinsic volume resistivity and sealing properties of the obtained Fuel cell separator were measured and judged respectively. These measurement and judgment were performed in the following manners, and the results thereof were shown in Table 1, respectively.

Figure 2:
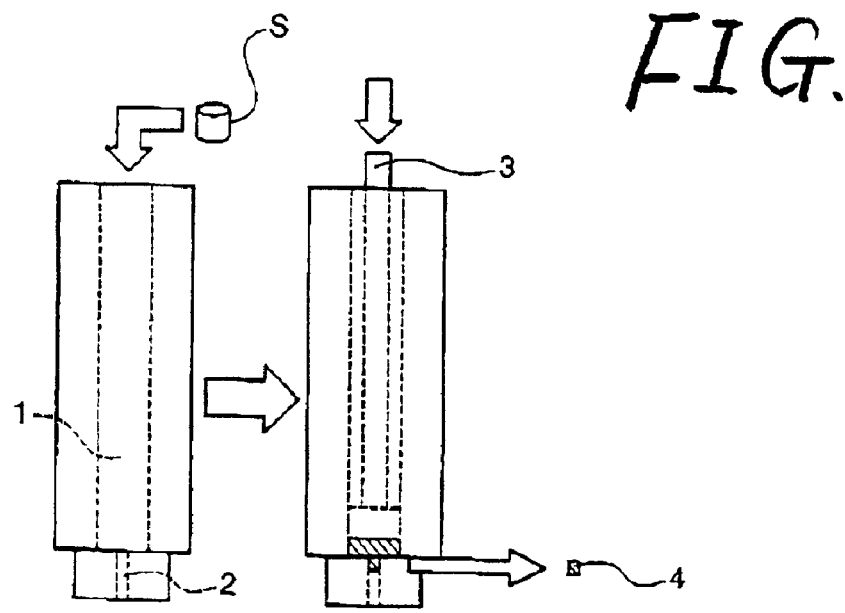
FIG. 2 is a configuration view showing a tester used for evaluating the flow index in Examples.

[Flow Index]
The flow index was evaluated in a method for testing flow of thermoplastic resin according to JIS K7210. That is, as shown in FIG. 2, a tester in which a hole 2 having an inner diameter of 1 mm is provided continuously to the lower portion of a hole 1 having an inner diameter of 10 mm is heated to 180° C. Then, each of preformed products S made of a kneaded compound as described above and having an initial weight with an outer diameter of 8 mm is thrown into the hole 1 having the inner diameter of 10 mm. The preformed product S is then pressed in at a constant load (10 MPa) by a pressure member 3, and retained for 4 minutes. After that, a specimen 4 flowing out from the hole 2 is cut out. The weight of the specimen 4 is measured, and the flow index is obtained in accordance with the following expression.

flow index=[(weight of preformed product S−weight of specimen 4)/weight of specimen 4]×100(%)

[Intrinsic Volume Resistivity]
The intrinsic volume resistivity was obtained in a method for testing resistivity on conductive plastics on the basis of a 4-point probe technique according to JIS K7194. That is, each of the above-mentioned kneaded compounds was formed into a sheet 0.7 mm thick, and the surface resistance value of the center portion of the sheet was measured with a 4-point probe type conductivity meter, Loresta-CP. The intrinsic volume resistivity was obtained by multiplying the measured value by the thickness of the sample and a correction coefficient according to JIS K7194.

[Limit Thickness]
The limit thickness means a limit thickness with which a molded product having good sealing properties as described below can be obtained. The limit thickness was measured with a micrometer.

[Sealing Properties]
For testing the sealing properties, each specimen was set on a flange. Rubber gaskets were disposed on the opposite sides of the specimen so as to clamp the specimen at a gasket surface pressure of 5 MPa. At that time, soap water was applied to the specimen, and nitrogen gas was applied at a load of 0.2 MPa onto the opposite side to the surface applied with the soap water. The sealing properties of specimens with bubbles of the soap water appearing were judged as "x", while the sealing properties of specimens with no bubbles of the soap water appearing were judged as "o".

[Adhesion Properties]
The adhesion properties were evaluated according to three grades o, Δ and x on the basis of easiness to remove when each formed product (fuel cell separator) was released from the mold. That is, the grade o designates the state that the formed product can be removed from the mold easily, the grade Δ designates the state that a certain quantity of the kneaded compound adheres to the mold, and the grade x designates the state that a considerable quantity of the kneaded compound adheres to the mold, resulting in damage of the formed product.

TABLE 1

|  | Example 1 | Example 2 | Example 3 | Example 4 | Example 5 | Comparative Example 1 | Comparative Example 2 |
|---|---|---|---|---|---|---|---|
| Resin material (weight %) | 34 | 35 | 36 | 37.5 | 40 | 30 | 50 |
| Graphite powder (weight %) | 56 | 55 | 54 | 52.5 | 50 | 60 | 40 |
| Carbon fiber (weight %) | 10 | 10 | 10 | 10 | 10 | 10 | 10 |
| Flow index (%) | 5.01 | 9.12 | 9.78 | 12.44 | 14.37 | 2.84 | 23.9 |
| Intrinsic volume resistivity (μΩ · cm) | 1482 | 1314 | 1350 | 1721 | 1925 | 1456 | 2527 |
| Limit thickness (mm) | 0.15 | 0.15 | 0.15 | 0.15 | 0.15 | 0.2 | 0.3 |
| Sealing properties | o | o | o | o | o | x | x |
| Adhesion properties | o | o | o | o | Δ | o | x |

As shown in Table 1, the sealing properties of the fuel cell separator in Comparative Example 1 were poor for the following reason. That is, since the amount of the resin material was lower than the lower limit (34 weight %) of the amount according to the present invention, the kneaded compound was short of fluidity so that compression failure occurred. On the other hand, the sealing properties of the fuel cell separator in Comparative Example 2 were poor for the following reason. That is, since the amount of the resin material was, on the contrary, higher than the upper limit (40 weight %) according to the present invention, the kneaded compound adhered to the mold (the adhesion properties were also poor) so that the surface of the kneaded compound became rough when it was extracted from the mold. Further, when the amount of the resin material reaches 50%, the intrinsic volume resistivity increases on a large scale. This is because the amount of the graphite material is reduced.

Further, it is proved from the respective Examples that the reduction in thickness can be realized by setting the amount of the resin material to be in a range of approximately 34–40 weight %. This is also affected by the fluidity of the kneaded compound. It is suggested that the formability is improved by setting the flow index to be 5–20%.

From the above-mentioned respective evaluation results, it is concluded that 34–40 weight % is adequate to the amount of the resin material.

Second Embodiment

Next, description of a second embodiment will be made below in detail about the present invention.

In a fuel cell separator according to the present invention, solid epoxy resin remarkably lower in price than polyimide or the like is used as resin material so that reduction in price is achieved. In addition, specific solid epoxy resin whose epoxy equivalent weight is 300–500 is used as this solid epoxy resin so as to increase the crosslinking density and hence achieve high strength of the fuel cell separator. As a result, since no fibrous material is required to be blended, formability is also so excellent that a high-performance fuel cell separator can be obtained. In addition, because of high strength, reduction in thickness can be achieved.

Generally, the epoxy equivalent weight of epoxy resin is defined as a value obtained by dividing average molecular weight by the number of epoxy group per molecule, and expressed by "g/eq". Accordingly, the smaller the average molecular weight is, the smaller this value of the epoxy equivalent weight is. In addition, the larger the number of epoxy group per molecule is, the smaller the value of the epoxy equivalent weight is. The fact that the average molecular weight is small relative to the number of epoxy group per molecule means that the molecule per functional group is small. This is reflected on the fact that the crosslinking density increases. On the other hand, the fact that the number of epoxy group per molecule is larger means that the density of functional groups contributing to crosslinking is higher that much. Thus, the crosslinking density increases that much. To put the above description briefly, the smaller the epoxy equivalent weight is, the higher the crosslinking density in the final state becomes.

According to the knowledge of the present inventors, it is preferable that the epoxy equivalent weight of the solid epoxy resin used is not larger than 500. When the epoxy equivalent weight exceeds 500, an obtained formed product, that is, a fuel cell separator is short of strength. As for the lower limit of the epoxy equivalent weight, when the epoxy equivalent weight is smaller than 300, there is a problem that the softening point of the resin becomes so low that particles of the solid epoxy resin adhere to one another. Thus, it is appropriate to set the lower limit on 300.

Further, as for the solid epoxy resin whose epoxy equivalent weight is 300–500, one kind or a mixture of a plurality of kinds selected from bifunctional epoxy resins and polyfunctional epoxy resins with more than two functional groups may be used. Examples of the bifunctional epoxy resins include diglycidyl ethers of bisphenol A, bisphenol F, bisphenol S, neopentyl glycol, diglycidyl ether, etc. Examples of the polyfunctional epoxy resins with more than two functional groups include novolak type resins such as phenolic novolak type epoxy resin or resol novolak type epoxy resin, aromatic glycidyl ether type resins such as tetraphenyl glycidyl ether ethane or triphenyl glycidyl ether methane, aromatic glycidyl amine type resins such as triglycidyl-p-aminophenol or triglycidyl isocyanurate, etc. In addition, it is desired that this solid epoxy resin is ground and used as fine power whose average particle size is smaller than 100 $\mu$m, preferably not larger than 40 $\mu$m. When the particle size is large, the dispersibility with conductive material deteriorates.

It is preferable that the amount of the above-mentioned solid epoxy resin is 20–40 weight % of the total weight of the separator. When the amount of the solid epoxy resin is lower than 20 weight %, an obtained fuel cell separator is short of strength. When the amount exceeds 40 weight %, the compounding ratio of the conductive material is reduced relatively so that the conductivity becomes insufficient.

On the other hand, the conductive material is not limited specifically so long as the material is superior in conductivity. There can be used various graphite powders of graphite, expanded graphite, colloidal graphite, etc, having various shapes such as granular shapes, flake shapes, etc.; various carbon black powders of acetylene black, Ketjenblack, etc.; and so on. It is appropriate that these powders are approximately 10–100 $\mu$m in average particle size.

Incidentally, the amount of the conductive material can be set desirably in accordance with necessity, or may be set to occupy all the balance of the solid epoxy resin. That is, it is preferable that the amount of the conductive material is 60–80 weight % of the total weight of the separator.

The method for manufacturing the fuel cell separator according to the present invention is not limited specifically, but may be established as the following process.

That is, first, the conductive material and the solid epoxy resin are kneaded in the above-mentioned compound. Then, this kneaded compound is compressed at room temperature so as to produce a preformed product. Next, this preformed product is filled into a mold to which a mold release agent (graphite powder) has been applied, and compression molding is carried out at a temperature of 160° C. to 200° C. After that, the mold is cooled to 100° C. or lower, and a formed product is extracted from the mold. Thus, a fuel cell separator can be obtained. The method is not limited to such a compression molding method. Alternatively, for example, a molding method such as injection molding or extrusion molding, or the like, may be adopted. Incidentally, there is no limit in the shape of the fuel cell separator. For example, the fuel cell separator may be formed to have the structure shown in FIG. 1.

EXAMPLES ACCORDING TO SECOND EMBODIMENT

The second embodiment of the present invention will be described more specifically with its examples and comparative examples. However, the present invention is not limited to these examples at all.

Examples 6 to 8, Comparative Examples 3 to 5, and Reference Examples 1 and 2

Using the following resin material, conductive material and reinforcing fibrous material, kneaded compounds were prepared in the compounding ratios shown in Table 2 respectively. Then, fuel cell separators were produced out of the kneaded compounds in the following method. Incidentally, the shape shown in FIG. 1 was adopted as the shape of each of the fuel cell separators.

[Resin Material]
  solid epoxy resin A (epoxy equivalent weight 400)
  solid epoxy resin B (epoxy equivalent weight 900)
  polyimide resin

[Conductive Material]
  expanded graphite powder (bulk specific gravity 0.01 g/cm$^3$)

[Reinforcing Fibrous Material]
  carbon fiber (fiber diameter 13 $\mu$m and fiber length 370 $\mu$m)
  glass fiber (fiber diameter 10 $\mu$m and fiber length 200 $\mu$m)

[Manufacturing Method]

The kneaded compounds in the compounding ratios shown in Table 2 were pressed at room temperature so that perform products were produced. Each of these preformed products was filled into a mold whose inner surface was applied with expanded graphite power of bulk specific gravity 0.01 g/cm$^3$. Then, compression molding was performed at a temperature of 180° C. and at a pressure of 50–100 MPa.

Hot bending strength and intrinsic volume resistivity of each obtained fuel cell separator were measured, and further sealing properties and formability were evaluated. These measurement and evaluation were performed in the following manners, and the results thereof were shown in Table 2, respectively.

[Hot Bending Strength]

Hot bending strength was obtained in a method for testing bending properties on JIS K7171 plastics. The test was performed with an autograph having a thermostat and under a test atmosphere at a temperature of 100° C.

[Intrinsic Volume Resistivity]

Intrinsic volume resistivity was obtained in a method for testing resistivity on JIS K7194 conductive plastics on the basis of a 4-point probe technique. That is, each of the above-mentioned kneaded compounds was formed into a sheet 0.7 mm thick, and the surface resistance value of the center portion of the sheet was measured with a 4-point probe type conductivity meter, Loresta-CP. The intrinsic volume resistivity was obtained by multiplying the measured value by the thickness of the sample and a correction coefficient according to JIS K7194.

[Sealing Properties]

Each of sheet-like formed products made of the above-mentioned kneaded compounds was set on a flange. Rubber gaskets were disposed on the opposite sides of the formed product so as to clamp the formed product at a gasket surface pressure of 5 MPa. After that, soap water was applied to the surface of the formed product, and nitrogen gas of 0.2 MPa was loaded on the opposite side to the surface which has been applied with the soap water. As for evaluation standards, "o" was given to each formed product in which no bubble of the soap water appeared on the surface of the formed product, "Δ" was given to each formed product in which a certain quantity of bubbles of the soap water appeared on the surface of the formed product, and "x" was given to each formed product in which a large quantity of bubbles of the soap water appeared on the surface of the formed product.

[Formability]

Formability was evaluated by visual examination of the appearance of each of the formed products after the molding. As for evaluation standards, "o" was given to each formed product which had an excellent appearance, "Δ" was given to each formed product which had shallow wrinkles in its surface layer, and "x" was given to each formed product that was split.

TABLE 2

| | Example 6 | Example 7 | Example 8 | Comparative Example 3 | Comparative Example 4 | Comparative Example 5 | Reference Example 1 | Reference Example 2 |
|---|---|---|---|---|---|---|---|---|
| Compound | | | | | | | | |
| Solid epoxy resin A (Epoxy equivalent weight 400) | 20 | 30 | 40 | 15 | 45 | — | — | — |
| Solid epoxy resin B (Epoxy equivalent weight 900) | — | — | — | — | — | 30 | 20 | 20 |
| Polyimide resin | — | — | — | — | — | — | 5 | 5 |
| Glass fiber | — | — | — | — | — | — | 10 | — |
| Carbon fiber | — | — | — | — | — | — | — | 10 |
| Expanded graphite | 80 | 70 | 60 | 85 | 55 | 70 | 65 | 65 |
| Evaluation | | | | | | | | |
| Hot bending strength (MPa) | 32 | 42 | 47 | 25 | 40 | 26 | 45 | 55 |
| Intrinsic resistivity ($\mu\Omega \cdot$ cm) | 900 | 1100 | 1420 | 810 | 1640 | 1450 | 1490 | 1200 |

TABLE 2-continued

|  | Example 6 | Example 7 | Example 8 | Comparative Example 3 | Comparative Example 4 | Comparative Example 5 | Reference Example 1 | Reference Example 2 |
|---|---|---|---|---|---|---|---|---|
| Sealing properties | ○ | ○ | ○ | Δ | Δ | Δ | ○ | ○ |
| Formability | ○ | ○ | ○ | x | x | ○ | Δ | Δ |

Note:
The compounds are expressed by weight %.

As shown in Table 2, in Comparative Example 3, the strength was low because the quantity of solid epoxy resin was smaller than the lower limit value (20 weight %) according to the present invention. In addition, the formed product was split when gas pressure was applied thereto at the time of evaluation of the sealing properties. Further, the fluidity of the kneaded compound was low, and the formability was also poor.

In Comparative Example 4, because the quantity of solid epoxy resin was larger than the upper limit value (40 weight %) according to the present invention, the amount of expanded graphite was low, and the intrinsic volume resistivity was high. In addition, the formed product adhered to the mold so that the formed product was cracked when it was released from the mold. The formed product was split when gas pressure was applied thereto at the time of evaluation of the sealing properties.

In Comparative Example 5, the strength was low because solid epoxy resin whose epoxy equivalent weight was 900 was used. The sealing properties were poor for the same reason as that in Comparative Example 3.

On the other hand, the respective Examples obtained results equal to or surpassing those of the Reference Examples in which polyimide resin was blended. From this fact, it is proved that high-performance fuel cell separators can be obtained in spite of low price.

As described above, according to the first embodiment of the present invention, there is provided a fuel cell separator which can sufficiently cope with the requirement of reduction in thickness as well as basic performance such as sealing properties and the like.

Further, according to the second embodiment of the present invention, there is provided a high-performance fuel cell separator whose strength was made so high that reduction in price and thickness can be achieved.

What is claimed is:

1. A fuel cell separator comprising:
   conductive material which is a mixture of graphite particles and carbon fibers; and
   resin material,
   wherein said conductive material is present in an amount not lower than 60 weight % and said resin material is present in an amount of 34–40 weight % and a surface of said fuel cell separator is covered with graphite material having a thickness of 20 to 50 μm.

2. A fuel cell separator comprising:
   conductive material; and
   epoxy resin,
   wherein said epoxy resin is made of solid epoxy resin whose epoxy equivalent weight is 300–500.

3. The fuel cell separator according to claim 2, wherein an amount of said epoxy resin is 20–40 weight %.

4. A fuel cell separator according to claim 1 wherein the ratio of graphite particles to carbon fibers is 5–10:1 by weight.

5. A fuel cell separator according to claim 1 wherein the average particle size of the graphite particles is 10 to 100 μm.

6. A fuel cell separator according to claim 1 wherein the diameter of the carbon fibers is 5 to 30 μm and 100 to 500 μm in fiber length.

7. A fuel cell separator comprising:
   conductive material which is a mixture of graphite particles and inorganic fibers; and
   resin material,
   wherein said conductive material is present in an amount not lower than 60 weight % and said resin material is present in an amount of 34–40 weight % and a surface of said fuel cell separator is covered with graphite material having a thickness of 20 to 50 μm.

8. The fuel cell separator according to claim 7, wherein the inorganic fibers are selected from the group consisting of metal fibers, whiskers coated with carbon, and whiskers coated with metal.

\* \* \* \* \*